US012104547B1

(12) United States Patent
Wang et al.

(10) Patent No.: US 12,104,547 B1
(45) Date of Patent: Oct. 1, 2024

(54) POWER-BASED ELECTRIC TURBOCHARGER BOOST CONTROL

(71) Applicant: FCA US LLC, Auburn Hills, MI (US)

(72) Inventors: Shu Wang, Lake Orion, MI (US); David A Lawrence, Lake Orion, MI (US); Manvinder Singh, Auburn, WA (US); Ken Hardman, Clarkston, MI (US)

(73) Assignee: FCA US LLC, Auburn Hills, MI (US)

( * ) Notice: Subject to any disclaimer, the term of this patent is extended or adjusted under 35 U.S.C. 154(b) by 0 days.

(21) Appl. No.: 18/479,562

(22) Filed: Oct. 2, 2023

(51) Int. Cl.
*F02D 41/00* (2006.01)
*F02B 37/10* (2006.01)
*F02B 37/14* (2006.01)
*F02B 39/10* (2006.01)

(52) U.S. Cl.
CPC .......... *F02D 41/0007* (2013.01); *F02B 37/10* (2013.01); *F02B 37/14* (2013.01); *F02B 39/10* (2013.01); *F02D 2200/04* (2013.01)

(58) Field of Classification Search
CPC .. F02D 41/0007; F02D 2200/04; F02B 37/10; F02B 37/14; F02B 39/10
See application file for complete search history.

(56) References Cited

U.S. PATENT DOCUMENTS

| | | | | |
|---|---|---|---|---|
| 4,882,905 | A * | 11/1989 | Kawamura | F02B 39/10 290/52 |
| 8,079,257 | B2 * | 12/2011 | Shimizu | F01D 5/027 73/455 |
| 10,208,685 | B2 * | 2/2019 | Brinkmann | F02B 39/10 |
| 10,247,142 | B1 * | 4/2019 | Wang | F02M 35/024 |
| 10,584,630 | B2 * | 3/2020 | Lawrence | F02D 41/0007 |
| 2012/0137682 | A1 * | 6/2012 | Hatley | F02B 39/12 60/608 |
| 2013/0269342 | A1 * | 10/2013 | Oh | F02B 39/10 60/273 |
| 2019/0338697 | A1 * | 11/2019 | Kelly | F02B 37/14 |
| 2021/0102545 | A1 * | 4/2021 | Weigand | F02B 37/10 |
| 2022/0186660 | A1 * | 6/2022 | Herceg | F02B 37/14 |

* cited by examiner

*Primary Examiner* — Carl C Staubach
(74) *Attorney, Agent, or Firm* — Jeremy J. Klobucar

(57) ABSTRACT

A control system and method for controlling an engine comprising an electric turbocharger are presented. The system comprises a wastegate valve configured to control a pressure of exhaust gas in an exhaust system of the engine at a turbine of the electric turbocharger. A controller obtains a set of parameters that each affect exhaust gas energy; using the set of parameters: (i) determines a target mass flow into the engine and a target boost for the turbocharger to achieve a torque request; (ii) determines a target power for a compressor of the turbocharger to achieve the target engine mass flow and the target turbocharger boost; (iii) determines an electric turbocharger motor power target; (iv) determines, based on the target power for the compressor and the electric turbocharger motor power target, a target pressure ratio and a target mass exhaust flow for the turbine of the electric turbocharger.

19 Claims, 3 Drawing Sheets

POWER-BASED ELECTRIC TURBOCHARGER BOOST CONTROL

FIELD

The present application generally relates to electric turbochargers and, more particularly, to techniques for power-based electric turbocharger boost control.

BACKGROUND

A turbocharger is a turbine-driven, forced-induction device that increases airflow into an internal combustion engine. A compressor, which is driven by a turbine, draws in ambient air and compresses it before it enters the engine at an increased pressure. This results in a greater mass of air entering cylinders of the engine on each intake stroke, which increases the engine's efficiency through decreased throttling losses and increases the engine's power output. Kinetic energy of exhaust gas produced by combustion of the air and a fuel within the cylinders is then utilized to drive the turbine of the turbocharger.

Conventional control strategies for vehicle turbocharger systems are often inefficient from the perspective of both man hours required to calibrate and effectiveness of the control strategy. One potential source of this inefficiency is the large number of interconnected components (the compressor, the turbine, a throttle valve, a wastegate valve, variable camshaft actuators, etc.) and their varying fluid effects. These conventional turbocharger control techniques can involve extensive calibration and re-calibration efforts, if other control calibrations are changed (such as spark timing or variable camshaft timing), which is difficult and sometimes infeasible, particularly right before vehicle production.

Other turbocharger systems include electric turbochargers. An electric turbocharger includes an electric motor that rotates a turbo shaft that in turn drives the compressor. The electric motor is powered by a battery system. For an internal combustion engine with an electric turbocharger, there can be a complication to coordinate exhaust gas flow power with the power of the electric motor. Accordingly, while such turbocharger control systems work for their intended purpose, there remains a need for improvement in the relevant art.

SUMMARY

According to one example aspect of the invention, a control system for an engine comprising an electric turbocharger is presented. In one exemplary implementation, the system comprises a wastegate valve configured to variably open and close to control the flow of exhaust gas in an exhaust system of the engine at a turbine of the electric turbocharger; and a controller configured to: obtain a set of parameters that each affect exhaust gas energy; using the set of parameters: (i) determine a target mass flow into the engine and a target boost for the turbocharger to achieve a torque request; (ii) determine a target power for a compressor of the electric turbocharger to achieve the target engine mass flow and the target electric turbocharger boost; (iii) determine an electric turbocharger motor power target; (iv) determine, based on the target power for the compressor and the electric turbocharger motor power target, a target pressure ratio and a target mass exhaust flow for the turbine of the electric turbocharger to achieve a target turbine power equal to the target compressor power, and (v) determine a target position of the wastegate valve to achieve the target turbine pressure ratio and mass exhaust flow; and command the wastegate valve to the target position.

In some implementations, the controller is configured to determine the electric turbocharger motor power target based on a battery state of charge (SOC) of a battery system that powers an electric motor of the electric turbocharger.

In some implementations, the controller is configured to determine the electric turbocharger motor power target based on performance drive modes.

In other implementations, the controller is further configured to determine whether the current turbine (exhaust) power is greater than the target. The controller is further configured to determine whether a battery charge is allowed and, based on the current power being greater than the target and the battery charge being allowed, run the electric turbocharger motor in a regeneration mode. The controller is configured to open the wastegate valve based on the current turbine power being greater than the target, and battery charge not being allowed. The controller is further configured to determine whether a battery discharge of the battery system is allowed and, based on the target exhaust power being greater than the current exhaust power, and the battery discharge being allowed, run the electric turbocharger motor to power the electric turbocharger.

In additional implementations, the controller is configured to send a message to a human machine interface indicative of an error based on the exhaust power not being greater than the target and the battery discharge not being allowed.

In implementations, the controller is configured to utilize a complete model of the electric turbocharger to determine the target compressor power, the target pressure ratio and the target mass exhaust flow for the turbine, and the target position of the wastegate valve.

In some implementations, the controller is configured to determine the target compressor power using a compressor power model portion of the complete electric turbocharger model, the compressor power model utilizing the following equation:

$$P_C = \frac{\dot{m} c_p T_{1C}}{\eta_C}\left(PR^{\left(\frac{\gamma-1}{\gamma}\right)} - 1\right),$$

where $P_C$ is the target compressor power, $\dot{m}$ is the target compressor mass flow, $c_p$ and $\gamma$ are a specific heat and a specific heat ratio of intake air, respectively, $T_{1C}$ is a compressor inlet temperature, PR is a compressor pressure ratio, which represents a ratio between compressor outlet pressure and compressor inlet pressure, and $\eta_C$ represents compressor efficiency.

In some implementations the controller is configured to determine the target turbine pressure ratio and mass exhaust flow using a turbine power model portion of the complete electric turbocharger model, the turbine power model being based on the following equation:

$$P_T = \dot{m} \eta_T c_p T_{1T}\left(1 - PR^{\left(\frac{\gamma-1}{\gamma}\right)}\right),$$

where $P_T$ is the target turbine power, m is the target turbine mass exhaust flow, $c_p$ and $\gamma$ are a specific heat and a specific heat ratio of exhaust gas, respectively, $\eta_T$ represents turbine efficiency, $T_{1T}$ is a turbine inlet temperature, and PR represents a turbine pressure ratio, which represents a ratio between turbine outlet and inlet pressures.

According to another aspect of the invention, a method of controlling an engine comprising an electric turbocharger is presented. In one exemplary implementation, the method comprises obtaining, by a controller, a set of parameters that each affect exhaust gas energy; using the set of parameters: (i) determining, by the controller, a target mass flow into the engine and a target boost for the turbocharger to achieve a torque request; (ii) determining, by the controller, a target power for a compressor of the turbocharger to achieve the target engine mass flow and the target turbocharger boost; (iii) determining, by the controller, an electric turbocharger motor power target; (iv) determining, by the controller and based on the target power for the compressor and the electric turbocharger motor power target, a target pressure ratio and a target mass exhaust flow for a turbine of the electric turbocharger to achieve a target turbine power equal to the target compressor power; and (v) determining, by the controller, a target position of a wastegate valve to achieve the target turbine pressure ratio and mass exhaust flow, the wastegate valve being configured to variably open and close to control a flow of the exhaust gas in an exhaust system of the engine at the turbine; and commanding, by the controller, the wastegate valve to the target position.

In some implementations, the method further comprises determining the electric turbocharger motor power target based on a battery state of charge (SOC) of a battery system that powers an electric motor of the electric turbocharger.

In other implementations, the method further comprises determining the electric turbocharger motor power target based on performance drive modes.

In additional implementations, the method further comprises determining whether the target exhaust power is greater than the current exhaust power.

In additional implementations, the method further comprises determining whether a battery charge of the battery system is allowed and, based on the current exhaust power being greater than the target and the battery charge being allowed, run the electric turbocharger motor in a regeneration mode.

In additional implementations, the method further comprises determining whether a battery charge of the battery system is allowed and, based on the current exhaust power being greater than the current and the battery discharge being not allowed, open the wastegate valve.

In additional implementations, the method further comprises determining whether a battery discharge of the battery system is allowed and, based on the target exhaust power being greater than the current and the battery discharge being allowed, run the electric turbocharger motor to power the electric turbocharger.

In additional implementations, the method further comprises sending a message to a human machine interface indicative of an error based on the exhaust flow not being greater for the turbine and the battery discharge not being allowed.

Further areas of applicability of the teachings of the present disclosure will become apparent from the detailed description, claims and the drawings provided hereinafter, wherein like reference numerals refer to like features throughout the several views of the drawings. It should be understood that the detailed description, including disclosed embodiments and drawings referenced therein, are merely exemplary in nature intended for purposes of illustration only and are not intended to limit the scope of the present disclosure, its application or uses. Thus, variations that do not depart from the gist of the present disclosure are intended to be within the scope of the present disclosure.

DETAILED DESCRIPTION

Figure 1:
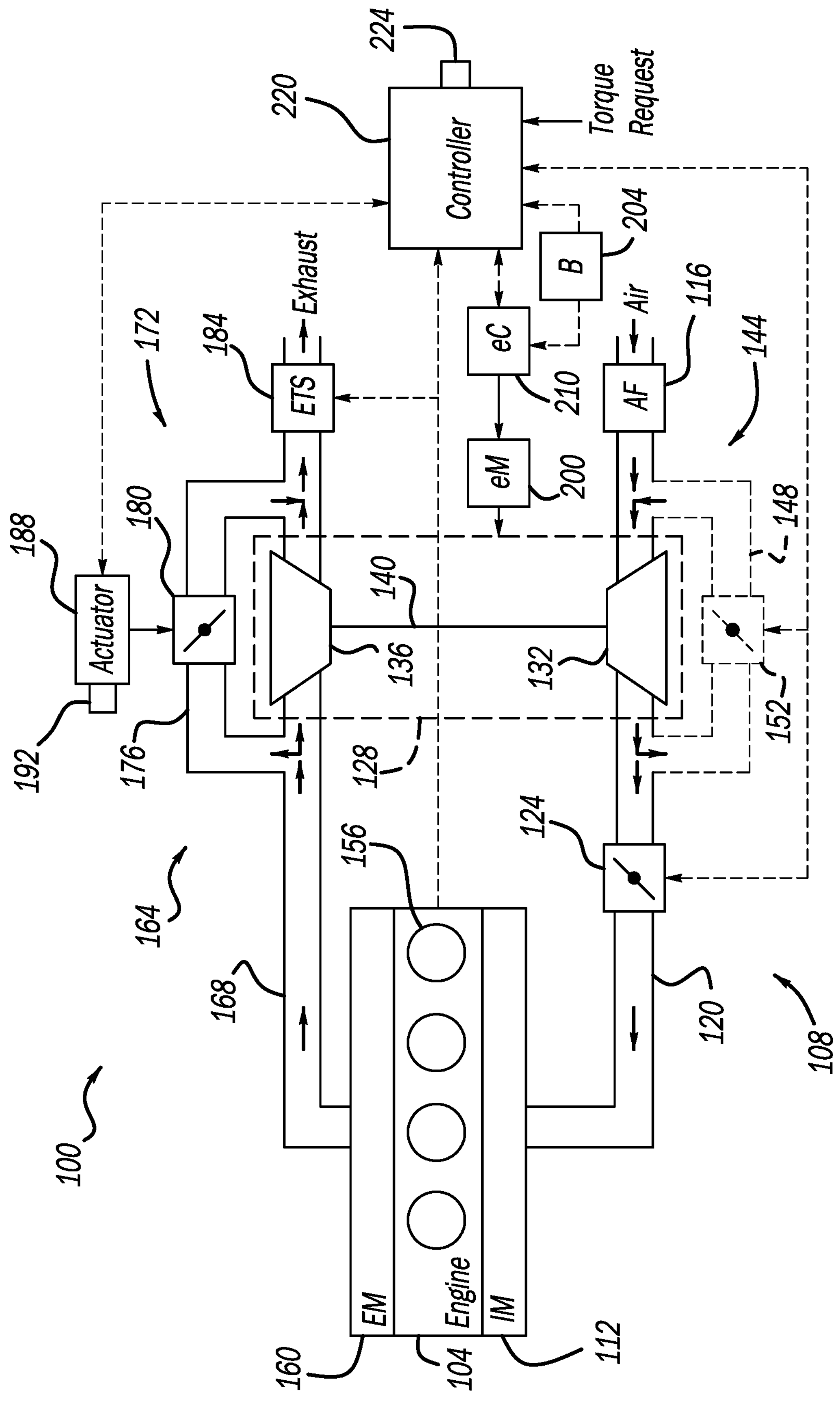
FIG. 1 is a diagram of an example vehicle comprising an electric turbocharger engine according to the principles of the present disclosure.

Vehicle turbocharger systems are configured to perform "boost control." Boost control aims to achieve an engine airflow demand (based on a driver's torque request) via positioning of a wastegate valve. The wastegate valve position, however, must change in response to not only airflow demand changes, but also in response to changes in operating conditions when airflow demand is unchanging. Non-limiting examples of these operating conditions include ambient air temperature, compressor inlet pressure (altitude changes), exhaust gas recirculation (EGR) configuration (e.g., low pressure vs. high pressure), throttle inlet pressure (TIP) reserve, spark timing, air/fuel ratio, and exhaust gas temperature.

As previously mentioned, conventional turbocharger systems perform empirical closed-loop control of the wastegate valve. For example, this could include empirical-based feed-forward control with boost pressure sensor feedback for closed-loop proportional-integral-derivative (PID) control. Empirical-based methods, however, require extensive calibration and re-calibration, such as when other features are re-calibrated (valve lift, valve timing, spark timing, etc.). These methods also heavily rely upon PID feedback due to constrained feed-forward compensation for operating condition changes. This is a slow, reactive approach in which the system waits for error and then responds. Such systems are also dependent on the engine/component configuration (EGR, scavenging, variable valve control (VVC), secondary boosting devices, lean/rich operation, etc.).

Accordingly, power-based turbocharger boost control techniques are presented. These techniques utilize a complete physics-based model of a turbocharger for determining wastegate valve position based on a power demand of the turbocharger, while also automatically compensating for changing engine operating conditions and states. By utilizing this model and accounting for all operating conditions and states up front, the disclosed techniques are proactive in positioning the wastegate valve as opposed to the conventional reactive positioning techniques discussed above. These techniques are also independent of the engine/component configuration. Potential benefits include decreased calibration costs and improved vehicle efficiency (performance/responsiveness, fuel economy, etc.).

As mentioned above, other turbocharger systems include electric turbochargers. An electric turbocharger includes an electric motor that rotates a turbo shaft that in turn drives the compressor and turbine wheels. The electric motor is powered by a battery system. For an internal combustion engine with an electric turbocharger, there can be a complication to coordinate exhaust gas flow power with the power of the electric motor. Both the wastegate system and electric motor are actuators (inputs) that are used to control engine boost pressure. The electric motor can provide extra power to help increase boost and can also absorb turbo shaft power to generate electrical power. Power management of the electric motor can be limited by the state of charge of the battery.

Figure 2:
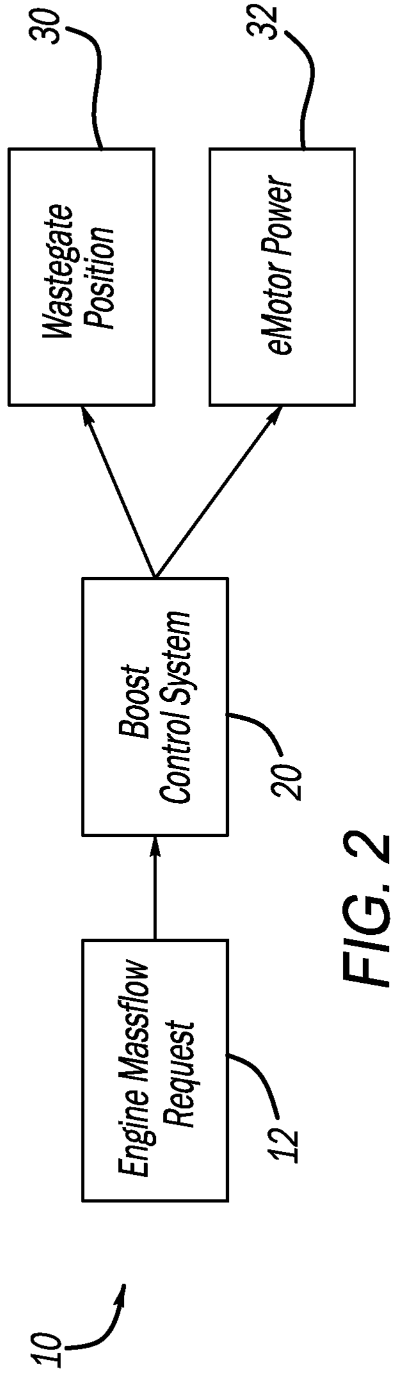
FIG. 2 is a boost logic flow diagram of an example method of operating the electric turbocharger engine according to the principles of the present disclosure.

Additional techniques described herein achieve engine airflow demand by way of positioning of the wastegate valve and a rotational input from the electric motor. The torque demand corresponds to an engine flow which is managed by the positioning of the wastegate valve and rotational input of the electric motor. As illustrated in FIG. 2, a boost logic control flowchart 10 is shown where an engine massflow request 12 is received by the boost control system 20. The boost control system 20 determines a wastegate position 30 and an electric motor power 32 based on the engine massflow request.

Referring now to FIG. 1, a diagram of an example vehicle 100 is illustrated. The vehicle 100 includes an engine 104 configured to combust an air/fuel mixture to generate drive torque. The engine 104 includes an intake system 108 that draws fresh air into an intake manifold (IM) 112 through an air filter (AF) 116 and an induction passage 120. A throttle valve 124 regulates a flow of air through the induction passage 120. A turbocharger 128 comprises a compressor 132 (e.g., a centrifugal compressor) that pressurizes or forces the air through the induction passage 120. The compressor 132 is coupled to a turbine 136 (e.g., a twin-scroll turbine) of the turbocharger 136 via a shaft 140. The intake system 108 optionally comprises a recirculation system 144 comprising a recirculation passage 148 and a recirculation valve 152 for selectively bypassing the compressor 132.

The pressurized air is distributed to a plurality of cylinders 156 and combined with fuel (e.g., from respective direct-injection or port-injection fuel injectors) to form an air/fuel mixture. While four cylinders are shown, it will be appreciated that the engine 104 could include any number of cylinders. The air/fuel mixture is compressed by pistons (not shown) within the cylinders 156 and combusted (e.g., via spark from respective spark plugs) to drive the pistons, which turn a crankshaft (not shown) to generate drive torque. The drive torque is then transferred to a driveline (not shown) of the vehicle 100, e.g., via a transmission (not shown). Exhaust gas resulting from combustion is expelled from the cylinders 156 and into an exhaust manifold (EM) 160 of the engine 104.

The exhaust gas from the exhaust manifold 160 is provided to an exhaust system 164 comprising an exhaust passage 168. Kinetic energy of the exhaust gas drives the turbine 136, which in turn drives the compressor 132 via the shaft 140. A wastegate system 172 selectively bypasses the turbine 136 to regulate boost pressure (e.g., exhaust gas flow at an inlet of the turbine 136. The wastegate system 172 comprises a bypass passage 176 and a wastegate valve 180 that regulates the flow of exhaust gas through an orifice (e.g., the bypass passage 176). An exhaust gas treatment system (ETS) 184, such as a catalytic converter, treats exhaust gas to decrease or eliminate emissions before it is released into the atmosphere. In one exemplary implementation, the wastegate valve 180 is electrically-actuated by an electric actuator 188 (e.g., an electric motor that displaces an arm coupled to the wastegate valve 180) that also has an associated position sensor 192.

The turbocharger 128 can be further configured as an electric turbocharger having an electric motor 200 that rotates the shaft 140 that in turn drives the compressor 132. The electric motor 200 is powered by a battery system 204 based on signals from an electric turbocharger controller 210. In examples the battery system 204 is a high voltage source, such as a 48 volt source that supplies energy for the electric motor 200 to drive the compressor 132. In other modes, the electric motor 200 can operate in a regeneration mode where rotational energy from the electric motor 200 can be used to charge the battery system 204 or deliver electric power to a transmission or axle drive motor.

A controller, also referred to herein as an engine controller, 220 controls operation of the vehicle 100. Examples of components controlled by the controller 220 include the engine 104, the throttle valve 124, the optional recirculation valve 152, the wastegate valve 180 (e.g., via electric actuator 188), and the exhaust treatment system 184. It will be appreciated that the controller 220 controls specific components of the vehicle 100 that are not illustrated, such as, but not limited to, fuel injectors, spark plugs, an EGR valve, a VVC system (e.g., intake/exhaust valve lift/actuation), a transmission, and the like. The controller 220 controls operation of these various components based on measured and/or modeled parameters. A set of one or more sensors 224 are configured to measure one or more parameters (pressures, temperatures, speeds, etc.) as discussed in greater detail herein. Other parameters could be modeled by the controller 220, e.g., based on other measured parameters. The controller 220 is also configured to perform the engine/turbocharger control techniques of the present disclosure, which are discussed in greater detail below.

The controller 220 communicates parameters such as, but not limited to, a turbo speed target, a motor speed target and a motor power limit to the electric turbocharger controller 210. The electric turbocharger controller 210 communicates parameters such as, but not limited to, a turbine speed feedback, a voltage of the battery system 204 and temperatures to the electric turbocharger controller 210. In this regard, the engine controller 220 communicates with the electric turbocharger controller 210 sending speed and torque targets to the electric motor 200 and receives feedback speeds and temperatures. The battery system 204 communicates parameters such as, but not limited to, a battery state of charge (SOC) and a power/current limit to the electric turbocharger controller 210 and the engine controller 220. In this regard, the battery system 204 sends battery SOC, power limits and other parameters to the engine controller 220 and the electric turbocharger controller 210 to limit power of the electric motor 200.

Figure 3:
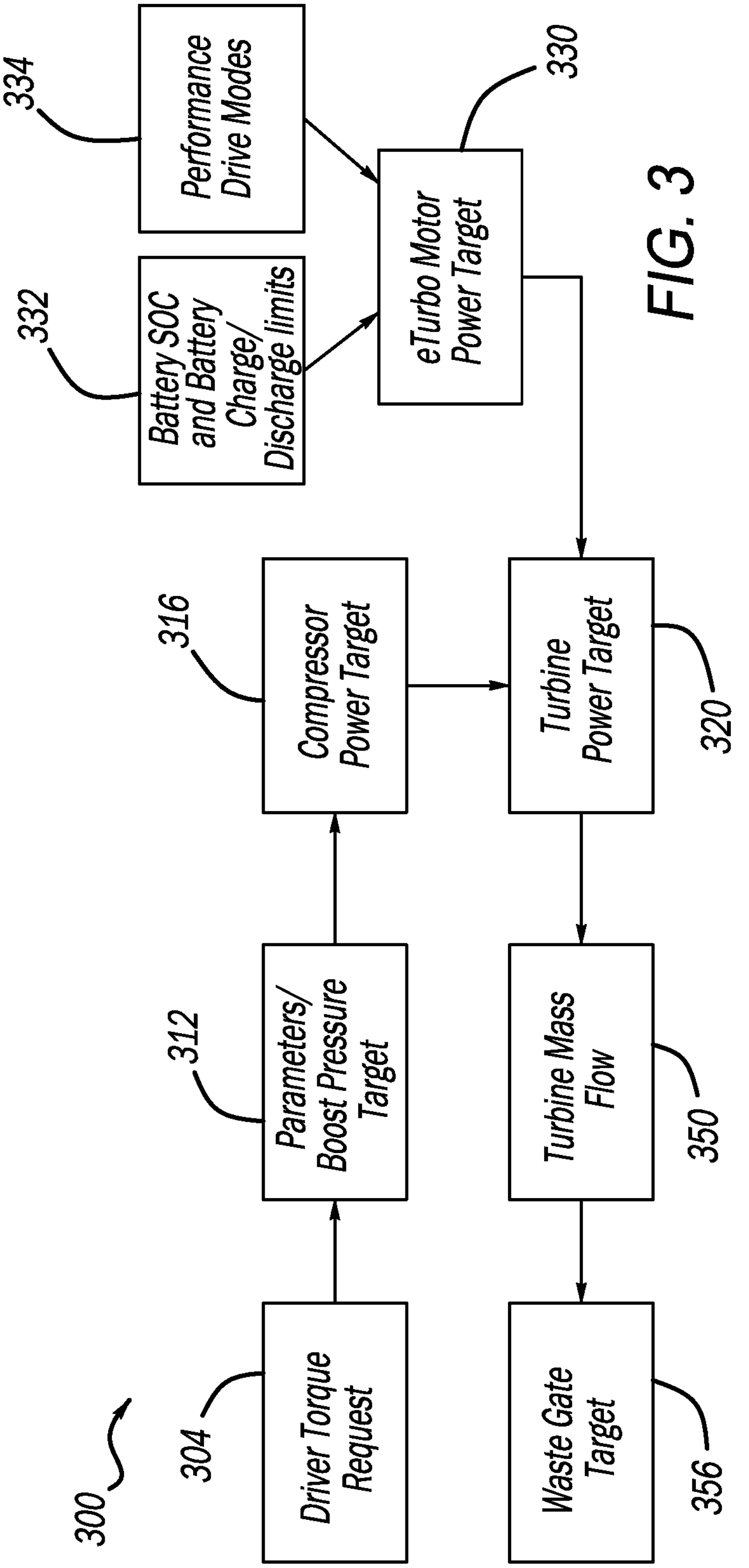
FIG. 3 is a flow diagram of an example method of operating the electric turbocharger engine according to the principles of the present disclosure.

Referring now to FIG. 3, a flow chart of an example method 300 of operating the engine 104 having the electronic turbocharger 128 is illustrated. For explanatory purposes, components of the vehicle 100 will be referenced, but it will be appreciated that this method 300 could be used for any engine having an electric turbocharger. At 304, the controller 220 obtains a torque request for the engine 104. In one exemplary implementation, this torque request is based on input from a driver via an accelerator pedal. In one example, an aggressive accelerator pedal input that exceeds a threshold results in a closing of the wastegate valve 180 to achieve maximum power out of the turbine 136. The electric motor 200 is used to (immediately) drive the compressor 132 without having to wait for the exhaust energy to ramp up.

At 312, the controller 220 obtains a set of parameters that each affect exhaust gas energy (i.e., the current condition(s)

at the turbine inlet). At least some of the parameters of the set of parameters will be utilized for each of the calculations discussed in greater detail below.

Examples of the parameters that affect exhaust gas energy include, but are not limited to: ambient (vehicle external) temperature, barometric pressure (altitude), throttle inlet pressure, intake manifold pressure, intake manifold temperature, turbine inlet temperature, compressor inlet pressure, compressor outlet pressure, compressor inlet temperature, turbine inlet pressure, turbine outlet pressure, spark retardation, engine coolant temperature, engine speed, intake air specific heat, exhaust gas specific heat, turbine inlet density, engine mass flow, enabled/disabled status of VVC and catalyst heating, target engine mass air flow, pressure losses across inlet system component(s) (e.g., air filter 116), air/fuel ratio, and current transmission gear. These parameters could be measured by sensors 224, modeled, or some combination thereof.

The following calculations/determinations each utilize at least some of the set of parameters obtained at 312. At 312, the controller 220 determines a target mass flow (air or air/EGR) into the engine 104 (e.g., a target compressor mass flow) and a target boost for the turbocharger 128 to achieve the torque request. At 316, the controller 220 determines a target power for the compressor 132 to achieve the target engine mass flow and the target turbocharger boost. As previously mentioned, the disclosed techniques utilize a complete physics-based model of the turbocharger 128, also referred to herein as a complete turbocharger model. The target compressor power determination is determined using a compressor power model portion of this complete model.

In one exemplary implementation, the compressor power model uses the following equation, along with calibrated compressor efficiency and speed maps:

$$P_C = \frac{\dot{m} c_p T_{1C}}{\eta_C}\left(PR^{\left(\frac{\gamma-1}{\gamma}\right)} - 1\right), \qquad (1)$$

where $P_C$ is the target compressor power, $\dot{m}$ is the target compressor mass flow (e.g., air or an air/exhaust mixture if EGR is utilized), $c_p$ and $\gamma$ are a specific heat and a specific heat ratio of intake air, respectively, $T_{1C}$ is a compressor inlet temperature, PR is a compressor pressure ratio, which represents a ratio between compressor outlet pressure and compressor inlet pressure (e.g., barometric pressure), optionally accounting for losses (e.g., across the air filter 116), and $\eta_C$ represents compressor efficiency. Using the above-referenced Equation (1), the compressor power model simultaneously computes both current and target compressor power and speed required to meet the torque request. The primary calibrations are the compressor efficiency and speed maps, which are both functions of corrected mass air flow and pressure ratio.

Because the compressor 132 and the turbine 136 are coupled together via the shaft 140, it will be assumed that for a conventional turbocharger, the power demand for the compressor 132 is the same as the power demand for the turbine 136. Thus, a turbine power model portion of the complete turbocharger model utilizes the target (compressor) power along with current conditions at the inlet of the turbine 136 (e.g., the set of parameters) to compute a turbine pressure ratio and turbine mass exhaust flow to achieve the target power.

At 320, the controller 220 determines the target pressure ratio based on the compressor power target 316 and an electric turbocharger motor power target 330. The electric turbocharger motor power target 330 represents the speed that the shaft 140 of the compressor is driven. The electric turbocharger motor power target 330 can depend on the turbocharger speed target which is determined using boost target/request and engine operating conditions. The electric turbocharger motor power target 330 can additionally be at least partially based on a battery SOC and charge/discharge limits 332 of the battery system 204 as well as performance drive modes 334. Performance drive modes 334 can include various electric motor 200 speed profiles (sport mode, etc.) available and associated with performance vehicles. In examples, if the battery SOC is close to a minimum SOC limit, the controller 210 may not provide the full allowable power to the electric turbocharger 128 as there may not be enough electrical energy to do so.

The target compressor pressure ratio depends on the target engine torque. The Compressor pressure ratio determines the compressor power target. The electric motor power (positive or negative) required for the compressor power. In other words, the power of the electric motor 200 and the turbine 136 is combined together to produce a total power of the compressor 132 to meet a torque request of the driver. Once the turbine power target 320 is met, the input speed of the electric motor 200 can be reduced and/or the wastegate valve 180 can be opened to further manage the system.

As will be described further with respect to FIG. 4, when the power of the electric motor 200 is positive, the battery system 204 can be discharged. When the power of the electronic motor 200 is negative, a regeneration mode is initiated and the battery system 204 can be charged. The power of the electric motor 200 is limited by the battery SOC and impacted by performance drive modes 334.

At 350 the target mass exhaust flow for the turbine 136 is determined based on the target compressor power and the set of parameters.

In one exemplary implementation, the turbine power model based on the following equation:

$$P_T = \dot{m}\eta_T c_p T_{1T}\left(1 - PR^{\left(\frac{\gamma-1}{\gamma}\right)}\right), \qquad (2)$$

where $P_T$ is the target turbine power, $\dot{m}$ is the target turbine mass exhaust flow, $c_p$ and $\gamma$ are a specific heat and a specific heat ratio of exhaust gas, respectively, $\eta_T$ represents turbine efficiency, $T_{1T}$ is a turbine inlet temperature, and PR represents a turbine pressure ratio, which represents a ratio between turbine outlet and inlet pressures. Equation (2) is not used directly in the turbine power model; rather, it is the basis for a unique mathematical derivation, based on the relationship between turbine pressure ratio and power. This derivation solves a key problem: for a given turbine power target, both the required turbine pressure ratio and the turbine mass exhaust flow are unknown, and therefore neither set point can be computed directly.

The derivation results in a turbine model that consists of a turbine pressure ratio calibration map that is a function of corrected turbine power and corrected turbine speed. These maps, for example, could be calibrated versions of compressor and/or turbine speed maps provided by the turbocharger manufacturer. Using this turbine pressure ratio map, the required turbine pressure ratio can be explicitly determined, at which point determination of the turbine mass exhaust flow is straightforward using a standard turbine flow map, which is a function of the turbine pressure ratio and the corrected turbine speed. Therefore, the turbine power model comprises two primary calibrations: a turbine pressure ratio map and a turbine flow map. A noteworthy second function of this turbine power model is the computation of the current turbine pressure ratio, which is the basis for a backpressure model.

At 350 and 356, the controller 220 determines a position of the wastegate valve 180 to achieve the target pressure ratio and the target mass exhaust flow for the turbine 136. This can also be described as determining the wastegate flow area (e.g., CdA) that yields the required wastegate/turbine mass exhaust flow split. This determination involves using a wastegate model portion of the complete turbocharger model. In one exemplary implementation, the determined position is a wastegate orifice flow area to achieve the target pressure ratio and the target mass exhaust flow for the turbine 136. This is also the point at which the physics-based features of the techniques become very clear. That is, the wastegate valve position is at its root being driven by a flow request, whereas a typical empirical system uses experimental data to estimate the physical position of the wastegate valve 180 straightaway for a fixed set of operating conditions.

In one exemplary implementation, the wastegate model utilizes the following equation:

$$CdA = \frac{\dot{m}}{\rho PR^{\left(\frac{1}{\gamma}\right)}\sqrt{\frac{2R}{MW}T_O\left(\frac{\gamma}{\gamma-1}\right)^{\left(1-PR^{\left(\frac{\gamma-1}{\gamma}\right)}\right)}}}, \tag{3}$$

where CdA is the required flow orifice area for the wastegate valve 180 (e.g., in $mm^2$), m is the wastegate mass exhaust flow, γ is the specific heat ratio of the exhaust gas, ρ represents turbine inlet density, R represents the ideal gas constant, MW represents the molecular weight of the exhaust gas, and PR is the turbine pressure ratio. By considering current and future conditions, the position of the wastegate valve 180 is optimized throughout a maneuver. For example, during a large torque request increase, the turbine flow requirement will tend to be higher than the current total exhaust port flow. In these situations, the disclosed techniques will automatically close the wastegate valve 180 fully until the total exhaust port flow accumulates and exceeds the turbine flow target, at which point the wastegate valve 180 will then open to meter or bleed off the excess exhaust gas flow.

Lastly, at 356, the controller 220 commands the wastegate valve 180 to the determined position. This determined position represents a position of the wastegate valve 180 that achieves the required flow orifice area discussed above, which is determined at 350 as illustrated. In one exemplary implementation, the controller 220 commands the electric actuator 188 to position the wastegate valve 180 at the determined position, e.g., based on feedback from position sensor 192. For example, certain positions of the electric actuator 188 could correspond to certain flow areas across the wastegate valve 180, and these relationships could be utilized to command the electric actuator 188 accordingly. After positioning the wastegate valve 180 appropriately at 356, the engine 104 is able to achieve increased efficiency and/or performance compared to typical empirical-based approaches. The method 300 then ends, but it will be appreciated that the method 300 could continually repeat during engine operation (e.g., every 10 milliseconds) to continuously optimize the position of the wastegate valve 180.

Figure 4:
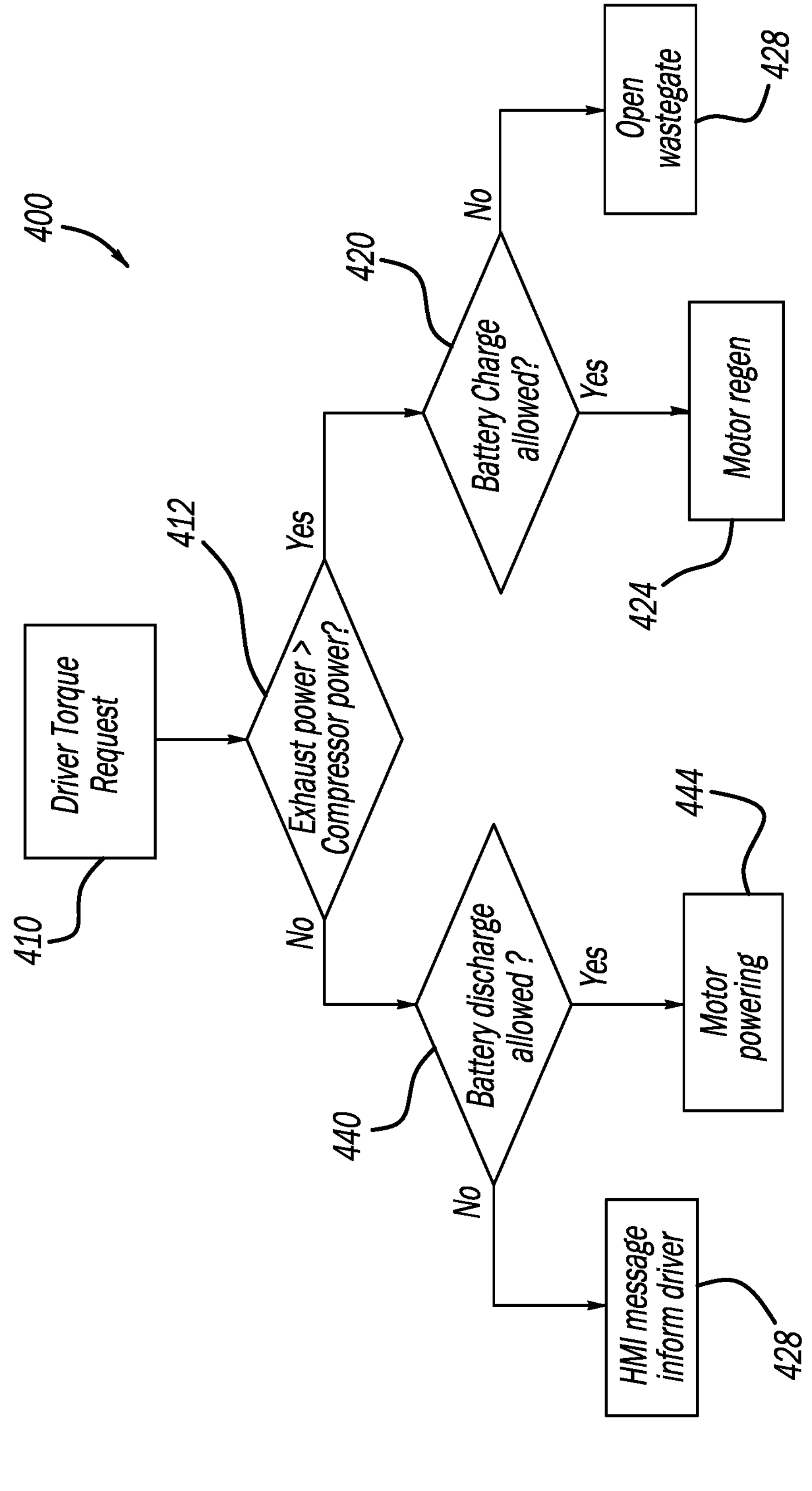
FIG. 4 is flow diagram of an example method of operating the electric turbocharger engine in a power mode or a regeneration mode according to principles of the present disclosure.

Turning now to FIG. 4, an exemplary method of determining a charge state of the battery system 204 while operating the engine 104 having the electronic turbocharger 128 is shown. Control receives a driver torque request at 410. At 412 control determines whether the exhaust power is greater than the compressor power. If yes, control determines whether charging of the battery system 204 is allowed. If yes, the electric motor 200 is used in a regenerative mode to charge the battery system 204. If battery charge is not allowed, the wastegate valve 180 is opened at 428. If exhaust power is not greater than compressor power at 412, control determines whether discharge of the battery system 204 is allowed at 440. If yes, control allows the electric motor 200 to drive the shaft 140 of the turbocharger 128. If no, control sends a message to a human machine interface (e.g. instrument cluster) indicative of an inoperable battery discharge event.

As previously discussed herein, the techniques of the present disclosure provide for, among other features and benefits, optimized turbocharge turbine energy management. Automatic compensation for operational conditions and/or changes is provided, such as for: altitude, humidity, transient maneuvers, shift torque management, knock spark retard, thermal enrichment, exhaust gas temperature and pressure, valve actuation strategy, ambient temperature, EGR system, and/or throttle inlet pressure. As also discussed above, the disclosed techniques are independent of the configuration of the vehicle or engine hardware, including: intake and exhaust system design, number of engine cylinders, EGR system design, lean/rich combustion strategy, scavenging strategy, intake and exhaust valve actuation technology, and secondary boosting devices.

It will be appreciated that the term "controller" as used herein refers to any suitable control device or set of multiple control devices that is/are configured to perform at least a portion of the techniques of the present disclosure. Non-limiting examples include an application-specific integrated circuit (ASIC), one or more processors and a non-transitory memory having instructions stored thereon that, when executed by the one or more processors, cause the controller to perform a set of operations corresponding to at least a portion of the techniques of the present disclosure. The one or more processors could be either a single processor or two or more processors operating in a parallel or distributed architecture.

It should be understood that the mixing and matching of features, elements, methodologies and/or functions between various examples may be expressly contemplated herein so that one skilled in the art would appreciate from the present teachings that features, elements and/or functions of one example may be incorporated into another example as appropriate, unless described otherwise above.

What is claimed is:

1. A control system for an engine comprising an electric turbocharger, the system comprising:
- a wastegate valve configured to variably open and close to control a flow of exhaust gas in an exhaust system of the engine at a turbine of the electric turbocharger; and
- a controller configured to:
  - obtain a set of parameters that each affect exhaust gas energy;

using the set of parameters:

(i) determine a target mass flow into the engine and a target boost for the electric turbocharger to achieve a torque request;

(ii) determine a target power for a compressor of the electric turbocharger to achieve the target engine mass flow and the target electric turbocharger boost;

(iii) determine an electric turbocharger motor power target;

(iv) determine, based on the target power for the compressor and the electric turbocharger motor power target, a target pressure ratio and a target mass exhaust flow for the turbine of the electric turbocharger to achieve a target turbine power equal to the target compressor power; and (v) determine a target position of the wastegate valve to achieve the target turbine pressure ratio and mass exhaust flow; and command the wastegate valve to the target position.

2. The system of claim 1, wherein the controller is further configured to determine the electric turbocharger motor power target based on a battery state of charge (SOC) of a battery system that powers an electric motor of the electric turbocharger.

3. The system of claim 2, wherein the controller is further configured to determine the electric turbocharger motor power target based on performance drive modes.

4. The system of claim 3, wherein the controller is further configured to determine whether a current turbine exhaust power is greater than the target.

5. The system of claim 4, wherein the controller is further configured to determine whether a battery charge is allowed and, based on the current exhaust power being greater than the target and the battery charge being allowed, run the electric turbocharger motor in a regeneration mode.

6. The system of claim 5, wherein the controller is configured to open the wastegate valve based on the current turbine exhaust power being greater than the target and the battery charge not being allowed.

7. The system of claim 4, wherein the controller is further configured to determine whether a battery discharge of the battery system is allowed and, based on the target compressor power being greater than the current exhaust power and the battery discharge being allowed, run the electric turbocharger motor to power the electric turbocharger.

8. The system of claim 7, wherein the controller is configured to send a message to a human machine interface indicative of an error based on the exhaust power not being greater than the target and the battery discharge not being allowed.

9. The system of claim 1, wherein the controller is configured to utilize a complete model of the electric turbocharger to determine the target compressor power, the target pressure ratio and the target mass exhaust flow for the turbine, and the target position of the wastegate valve.

10. The system of claim 9, wherein the controller is configured to determine the target compressor power using a compressor power model portion of the complete electric turbocharger model, the compressor power model utilizing the following equation:

$$P_C = \frac{\dot{m} c_p T_{1C}}{\eta_C}\left(PR^{\left(\frac{\gamma-1}{\gamma}\right)} - 1\right),$$

where $P_C$ is the target compressor power, $\dot{m}$ is the target compressor mass flow, $c_p$ and $\gamma$ are a specific heat and a specific heat ratio of intake air, respectively, $T_{1C}$ is a compressor inlet temperature, PR is a compressor pressure ratio, which represents a ratio between compressor outlet pressure and compressor inlet pressure, and $\eta_C$ represents compressor efficiency.

11. The system of claim 10, wherein the controller is configured to determine the target turbine pressure ratio and mass exhaust flow using a turbine power model portion of the complete electric turbocharger model, the turbine power model being based on the following equation:

$$P_T = \dot{m} \eta_T c_p T_{1T}\left(1 - PR^{\left(\frac{\gamma-1}{\gamma}\right)}\right),$$

where $P_T$ is the target turbine power, m is the target turbine mass exhaust flow, $c_p$ and $\gamma$ are a specific heat and a specific heat ratio of exhaust gas, respectively, $\eta_T$ represents turbine efficiency, $T_{1T}$ is a turbine inlet temperature, and PR represents a turbine pressure ratio, which represents a ratio between turbine outlet and inlet pressures.

12. A method of controlling an engine comprising an electric turbocharger, the method comprising:

obtaining, by a controller, a set of parameters that each affect exhaust gas energy;

using the set of parameters:

(i) determining, by the controller, a target mass flow into the engine and a target boost for the electric turbocharger to achieve a torque request;

(ii) determining, by the controller, a target power for a compressor of the electric turbocharger to achieve the target engine mass flow and the target electric turbocharger boost;

(iii) determining, by the controller, an electric turbocharger motor power target;

(iv) determining, by the controller and based on the target power for the compressor and the electric turbocharger motor power target, a target pressure ratio and a target mass exhaust flow for a turbine of the electric turbocharger to achieve a target turbine power equal to the target compressor power; and (v) determining, by the controller, a target position of a wastegate valve to achieve the target turbine pressure ratio and mass exhaust flow, the wastegate valve being configured to variably open and close to control a flow of exhaust gas in an exhaust system of the engine at the turbine; and commanding, by the controller, the wastegate valve to the target position.

13. The method of claim 12, further comprising determining the electric turbocharger motor power target based on a battery state of charge (SOC) of a battery system that powers an electric motor of the electric turbocharger.

14. The method of claim 13, further comprising determining the electric turbocharger motor power target based on performance drive modes.

15. The method of claim 14, further comprising determining whether the target exhaust power is greater than a current exhaust power.

16. The method of claim 15, further comprising determining whether a battery charge of the battery system is allowed and, based on the current exhaust power being greater than the target and the battery charge being allowed, run the electric turbocharger motor in a regeneration mode.

17. The method of claim 15, further comprising determining whether a battery charge of the battery system is allowed and, based on the current exhaust power being greater than the target and the battery charge being not allowed, open the wastegate valve.

18. The method of claim 15, further comprising determining whether a battery discharge of the battery system is allowed and, based on the target compressor power being greater than the current exhaust power and the battery discharge being allowed, run the electric turbocharger motor to power the electric turbocharger.

19. The method of claim 15, further comprising sending a message to a human machine interface indicative of an error based on the target exhaust power being greater than the current exhaust power and the battery discharge not being allowed.

* * * * *